Figure 5:
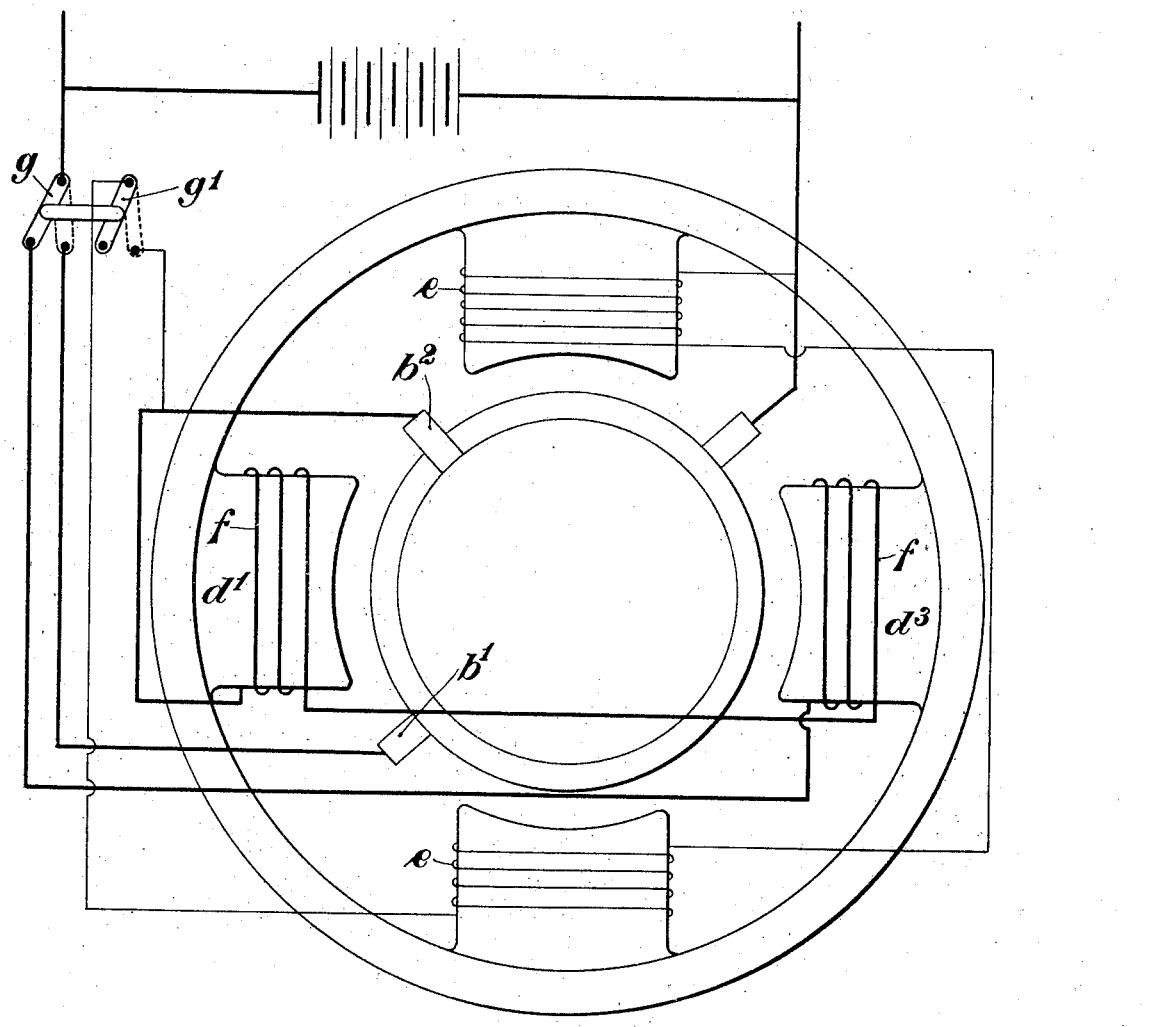

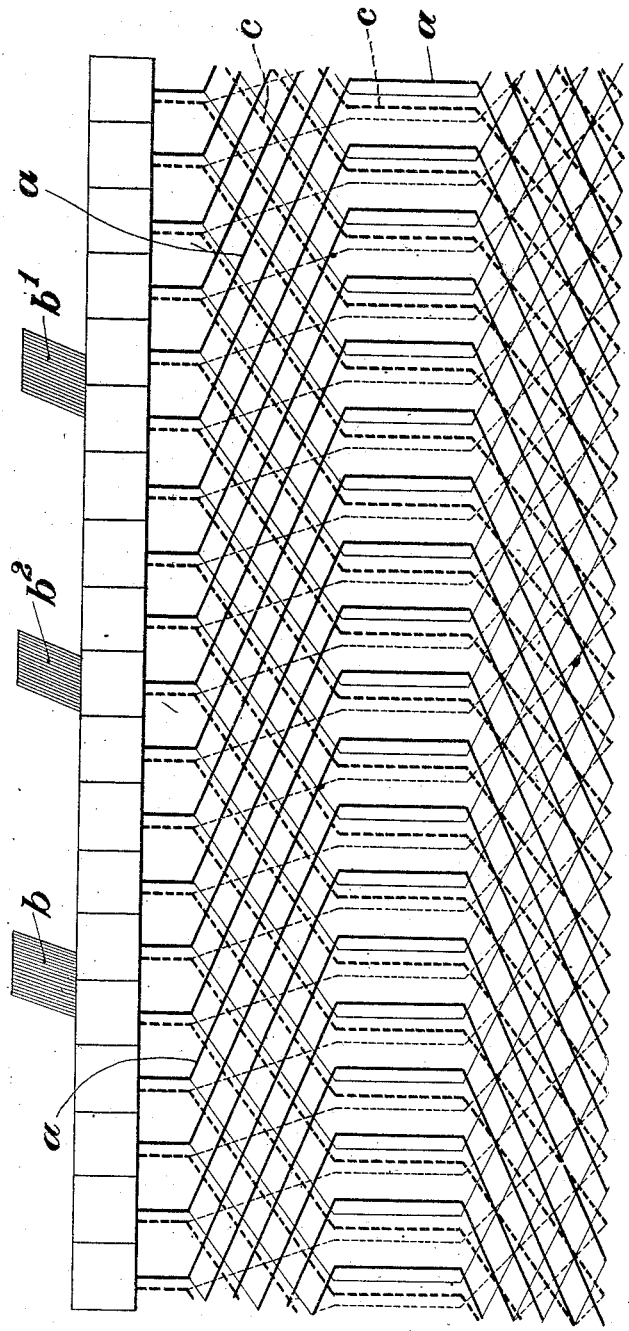

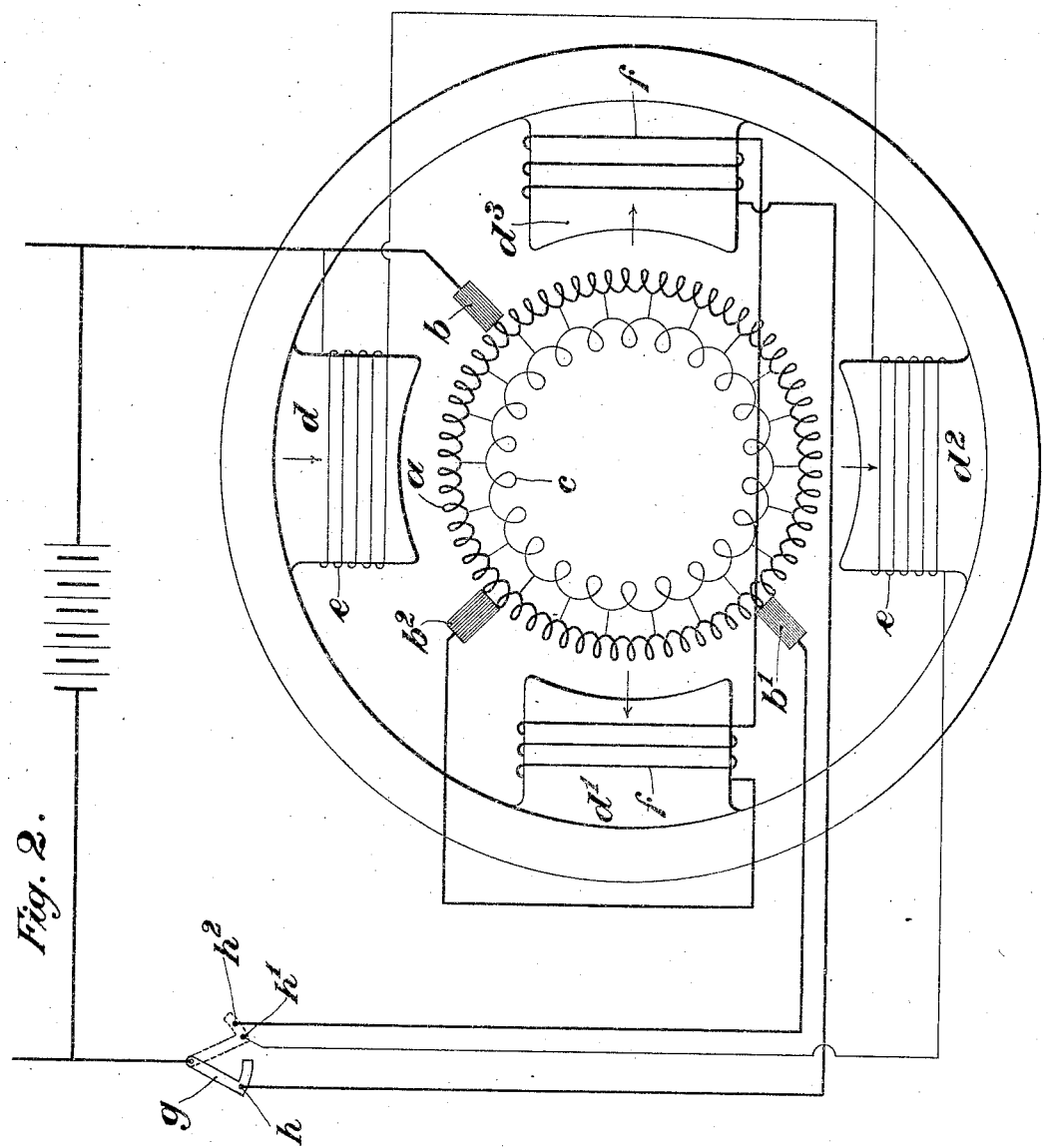

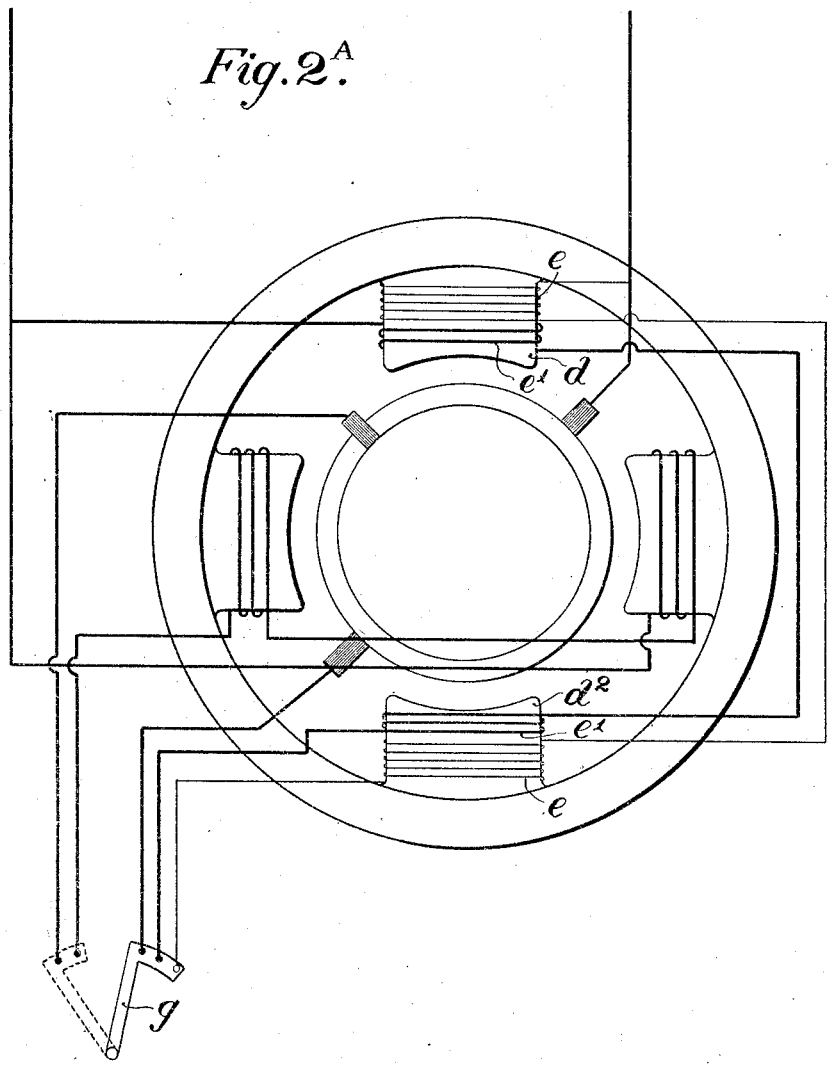

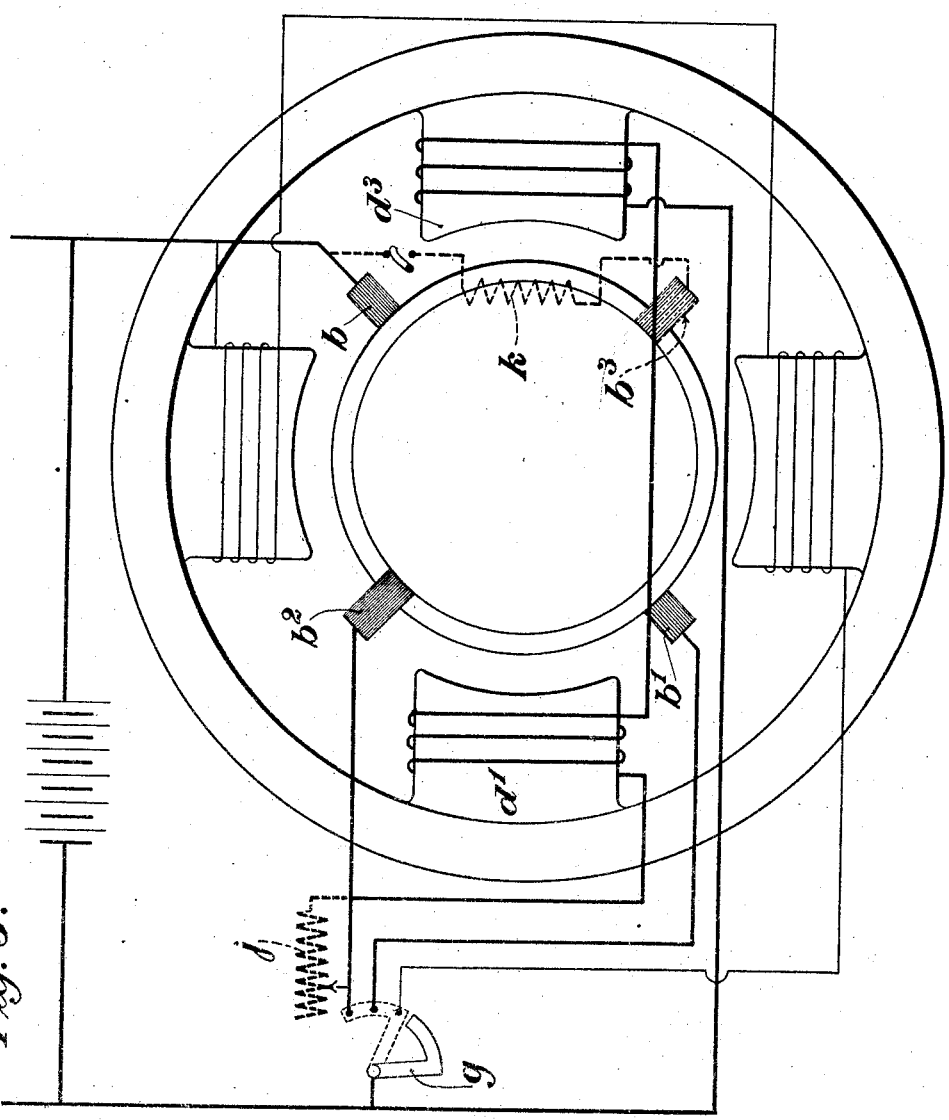

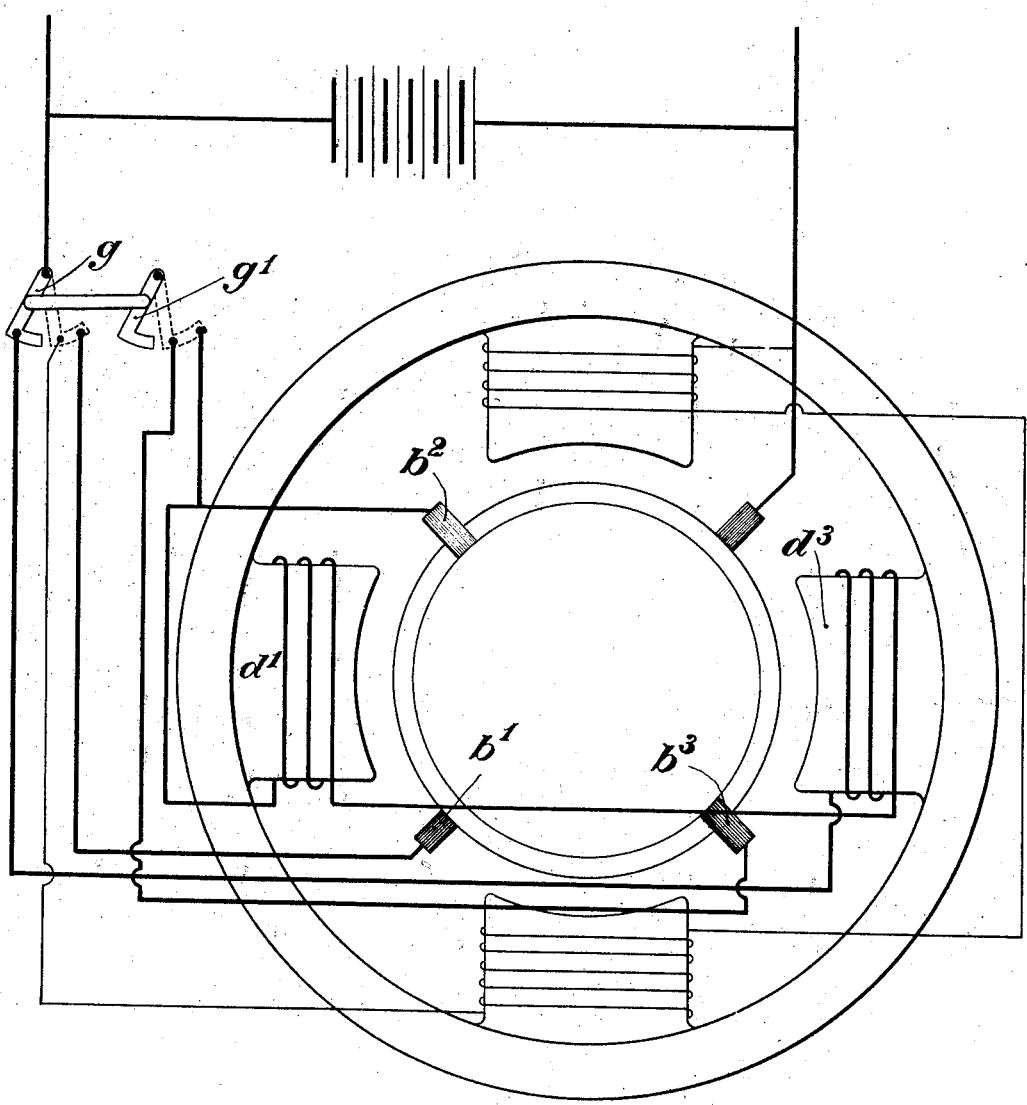

B. BROOKS & W. HOLT.
DYNAMO ELECTRIC MACHINE FOR COMBINED ELECTRIC LIGHTING AND ENGINE STARTING.
APPLICATION FILED NOV. 9, 1914.

1,189,050.

Patented June 27, 1916.
7 SHEETS—SHEET 6.

WITNESSES

INVENTORS Boultbee Brooks
William Holt
by
James L. Norris,
Attorney

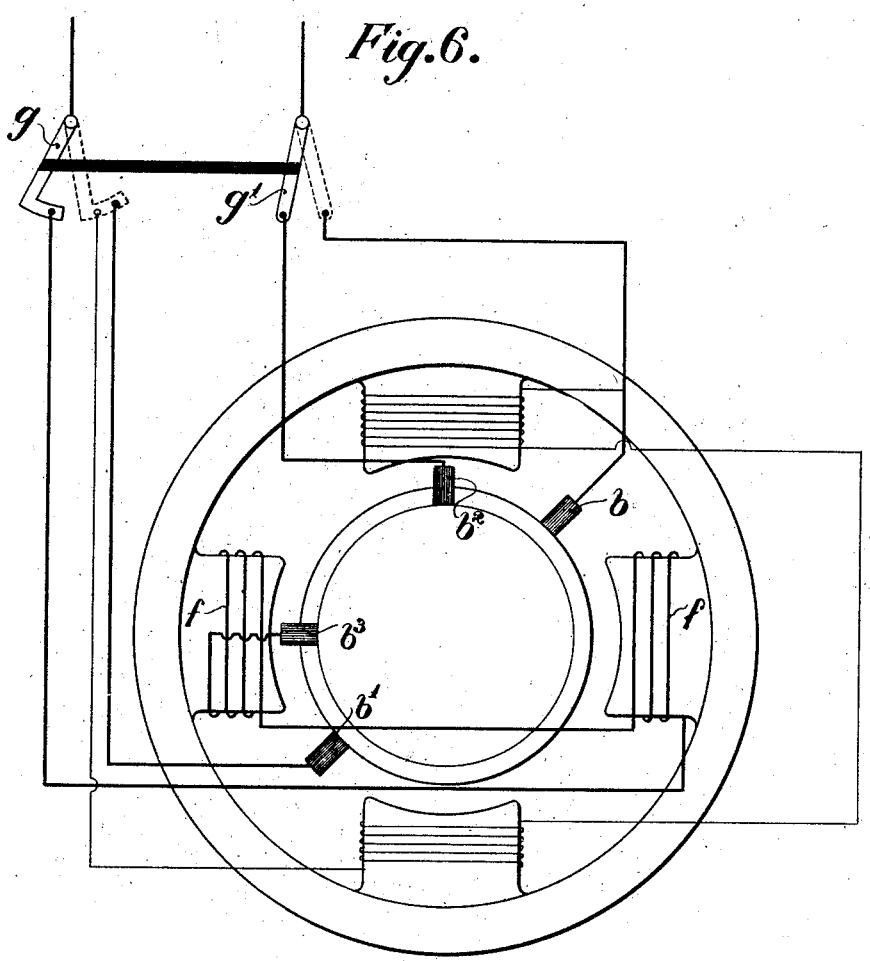

UNITED STATES PATENT OFFICE.

BOULTBEE BROOKS, OF BIRMINGHAM, AND WILLIAM HOLT, OF ERDINGTON, BIRMINGHAM, ENGLAND.

DYNAMO-ELECTRIC MACHINE FOR COMBINED ELECTRIC LIGHTING AND ENGINE-STARTING.

1,189,050.  Specification of Letters Patent.  Patented June 27, 1916.

Application filed November 9, 1914. Serial No. 871,182.

*To all whom it may concern:*

Be it known that we, BOULTBEE BROOKS and WILLIAM HOLT, subjects of the King of Great Britain, residing at Criterion Works, Great Charles street, Birmingham, England, and 213 Slade road, Erdington, Birmingham, England, respectively, have invented certain new and useful Improvements in Dynamo-Electric Machines for Combined Electric Lighting and Engine-Starting, of which the following is a specification.

This invention relates to dynamo-electric machines such as are used in conjunction with accumulators upon motor-vehicles, motor-boats, and the like, for the double purpose of electric lighting and engine starting, the machine being adapted to be run as a motor for the latter purpose.

The object of the present invention is to provide an improved machine which is suitable for supplying current as a slow speed dynamo when driven by the engine, or for running as a high speed electric motor with a powerful torque to drive the engine for starting purposes.

The invention consists in providing the armature with two separate and independent windings, each being adapted to operate with a magnet system of a different number of poles, and means being provided whereby the magnet system of the machine may be altered to provide the correct number of poles to suit the particular winding which it is desired should be in operation, according to whether the machine is required to be run as a high-speed motor or driven as a slow-speed dynamo.

Figure 1 of the accompanying drawings is a diagram showing the arrangement of the two windings on the armature. Fig. 2 shows the general arrangement of a machine adapted to be run as a two-pole shunt-wound dynamo or a four-pole series-wound motor. Fig. 2^A shows a modification in which means are provided for limiting or increasing the current supplied to the battery. Figs. 3 to 5 illustrate modifications in which the machine is arranged to be self-regulating when running as a dynamo, the series-wound poles acting as auxiliary poles. Fig. 6 is a diagram of a modified machine in which entirely separate brushes are used for the two windings.

Referring to Figs. 1 and 2, the armature is provided with two separate windings $a$, $c$, connected to the same commutator, one winding $a$ being a parallel winding arranged to operate in conjunction with a two-pole magnet system and the other $c$ a series or wave winding, being wound for a four-pole magnet system and having comparatively few turns. Three brushes $b$, $b^1$, $b^2$, are provided which are spaced at 90° to one another, those situated diametrically opposite or 180° apart viz., $h$, $h^1$, being arranged to carry the current generated by the two-pole winding $a$, while brushes $b$, $b^2$ or $b^1$, $b^2$, (according to the direction of rotation) are employed for supplying the four-pole winding $c$ when the machine is being run as a motor for starting purposes.

The magnet system is provided with four poles $d$, $d^1$ $d^2$, $d^3$, alternately carrying shunt and series windings $e$, $f$, respectively and the brushes are disposed between adjacent poles, the series windings being arranged when connected in circuit, to make the opposite poles $d^1$, $d^3$, both of the same polarity. In order to produce either a two-pole system or a four-pole system a switch $g$ is provided, arranged to coöperate with three contacts $h$, $h^1$, $h^2$, connected respectively to the series winding $f$, to the shunt winding $e$, and to brush $b^1$.

When the switch is in position shown in full lines a four-pole system is produced, the current passing around the coils $f$, $f$, these coils, however, being so wound that poles $d^1$, $d^3$ are magnetized with the same polarity, either both north poles or both south poles, and the magnetic flux in consequence making the poles $d$, $d^2$ (acting as unwound poles) of the opposite polarity, either both south or both north. This is the arrangement when running the machine as a motor. On the other hand, when the switch is in the position shown by dotted lines, the series coils are cut out, and a two-pole system results from the shunt coils $e$. This is the arrangement when running the machine as a dynamo.

The armature is arranged to be connected to the engine through any type of gear which admits of the gear ratio when running as a dynamo being less than when running as a motor.

The operation of the machine is as follows: To use the same as an electric motor for starting-up the engine the switch $g$ is placed in the position shown in full lines current being thus supplied to brushes $b$, $b^2$, the series coils only being in action so as to produce a four-pole system. The machine thus runs as a high-speed series-wound four-pole motor. The two-pole armature winding $a$ is inoperative, but the four-pole armature winding $c$, being of few turns, produces a powerful torque and a high speed of rotation. The power is transmitted through the gearing to the engine shaft, which is thus rotated until the engine runs under its own power. When this happens the starting switch $g$ is moved to the dotted position so that the pair of brushes $b$, $b^1$, at 180° apart are now connected to the battery, and at the same time the shunt coils $e$ are connected up, and the series coils $f$ cut out, so as to produce a two-pole magnet system.

The machine, being driven directly from the engine, then operates as a slow speed dynamo, generating current by means of the two-pole armature winding $a$, the four-pole winding $c$ being inoperative.

As shown in Fig. 2$^A$, series coils $e^1$ may be placed on the main poles $d$, $d^2$ and wound to oppose or to assist the shunt coils $e$, said series coils being joined to switch $g$ so as to be cut out when the switch occupies the dotted line position when the machine is running as a motor. According to whether the coils $e^1$ oppose or assist the coils $e$ so is the charging current to the battery reduced or increased.

Either three or four brushes may be used in a machine arranged for two or four poles, and the armature may be parallel or series wound. Any number of poles may be employed, depending on the particular design of machine. The shunt and series coils may be placed on all poles, or on alternate poles, and the machine when running as an electric motor can operate as either a series, compound or shunt machine. The two armature windings may be placed in the same or independent slots.

Any known or suitable method of self-regulation may be employed when running as a dynamo, for insuring a constant current output at variable speeds. For instance, as shown in Fig. 3, the brush $b^2$ may be connected, by the switch $g$ when in the dotted position, with the brush $b^1$, so as to short-circuit those armature coils which are situated under the poles $d^1$, $d^3$, these said poles acting as auxiliary poles for receiving the cross-magnetization of the armature, as described in United States Patent No. 1100567. Or instead of being directly short-circuited the brushes $b^1$, $b^2$, can be connected through a variable resistance $j$. If desired an additional brush $b^3$, shown by dotted lines, may be employed, same being connected to $b$ or through a resistance $k$ used to adjust the output, a suitable controller being provided to simultaneously effect the necessary changes. Or in the arrangement shown in Fig. 4, the brushes $b^3$, $b^2$, are short-circuited by the switch $g^1$, when in the dotted position, the poles $d^1$, $d^3$, functioning as auxiliary poles to effect the self-regulation. The switch $g^1$, is connected to the switch $g$ which operates as in Fig. 1. The self-regulation is effected as follows: The cross magnetization of the armature is received by the auxiliary poles $d^1$, $d^3$, and the current generated in the armature is led off by the short-circuited brushes $b^2$, $b^3$, which current, flowing in opposite quadrants of the armature, tends to demagnetize the main poles in the known manner.

In the modification shown in Fig. 5, two coupled-together switches $g$, $g^1$, are employed, the one $g$ controlling the series coils $f$ and the other $g^1$ controlling the shunt coils $e$, the latter being out of action while the series coils are in action. When the switches are in the position shown in full lines the four-pole system results, and when in the dotted-line position the two-pole system results. When running as a dynamo the poles $d^1$, $d^3$, act as auxiliary poles to effect the self-regulation in the known manner.

In these systems of self-regulation the series-wound poles function as wound or unwound auxiliary poles as the case may be, and are magnetized by the cross-flux from the armature winding.

Instead of having single brushes common to both windings entirely separate brushes may be used, if desired, by suitably spacing the connections to the commutator bars. Thus, in Fig. 6, the brushes $b$, $b^1$, are used in connection with the dynamo armature winding, and brushes $b^2$, $b^3$ are the brushes used in connection with the motor armature winding, all the said brushes bearing on the same commutator. The said brushes are connected up, as shown, brush $b^3$ being in series with the coils $f$, and two coupled-together switches $g$, $g^1$ being employed. When the switches are in the positions shown by full lines, the motor brushes $b^2$, $b^3$, are connected up, the machine being supplied with current and running as a motor, but when the switches are in the dotted position, the dynamo brushes $b$, $b^1$, are in circuit, the motor brushes being cut out.

Although the use of a four-pole magnet system when running the machine as a motor and a two-pole system when driving it as a dynamo has been described above, it is to be understood that the two-pole system may be used for running the machine as a motor and the four-pole system when driving as a dynamo, the armature windings appertaining to the two systems being suitably wound.

Having fully described our invention, what we desire to claim and secure by Letters Patent is:—

1. A direct-current dynamo electric machine for use in a motor for starting an internal combustion engine and as a generator for electric lighting, comprising an armature, two independent windings on the armature wound to operate with magnet systems of different numbers of poles and suitable for use when the machine functions as a generator and as a motor respectively, a magnet system comprising two sets of pole-pieces each provided with windings independent of one another, one set being used with one armature winding and the other set with the other armature winding, sets of brushes for conveying current to and from the respective armature windings, said sets of brushes being individually adapted to be connected to the said excitation windings appertaining to the respective armature windings so as to place the latter in circuit therewith, and means for changing the connections of the windings on the said pole-pieces and of the brushes for the purpose of varying the number of poles of the magnet system to suit the particular armature winding which it is desired should be in operation according to whether the machine is required to be run as a motor or driven as a dynamo.

2. A direct-current dynamo electric machine for use as a motor for starting an internal combustion engine and as a generator for electric lighting, comprising an armature, two independent windings on the armature wound to operate with magnet systems of different numbers of poles and suitable for use when the machine functions as a generator and as a motor respectively, a magnet system comprising two sets of pole-pieces wound with independent excitation windings of different types, one set being used with one armature winding and the other set with the other armature winding, sets of brushes for conveying current to and from the respective armature windings, said sets of brushes being individually adapted to be connected to the said excitation windings appertaining to the respective armature windings so as to place the latter in circuit therewith, and means for changing the connections of the windings on said poles and of the brushes so as to render some of said windings inoperative and cause the poles on which they are wound to act as unwound poles and so as to vary the number of poles of the magnet system to suit the particular armature winding which it is desired should be in operation according to whether the machine is required to run as a motor or driven as a dynamo.

3. A dynamo electric machine for use upon motor vehicles and the like, for the purpose of electric lighting and engine starting, comprising an armature, a commutator, two independent windings on the armature for use when the machine is being run as a dynamo and motor respectively, both being connected to the commutator and each adapted to operate with a magnet system of a different number of poles, a field magnet having a plurality of poles, field windings on said poles, a switch adapted to modify the windings in use so as to produce either a four-pole system or a two-pole system, and brushes on the commutator in the correct position to suit both armature windings.

4. A dynamo electric machine for use as a motor for starting an internal combustion engine and as a generator for electric lighting, comprising an armature, two independent windings on the armature wound to operate with magnet systems of different numbers of poles and suitable for use when the machine functions as a generator and as a motor respectively, a magnet comprising separate poles carrying separate excitation windings, all of which poles, when the machine runs as a motor, perform the same function of producing the main magnetic field and are used in conjunction with one armature winding, while when running as a generator, some of the poles are used as generating poles for producing the main field and the others as auxiliary poles for effecting, in conjunction with the other armature winding, the self-regulation of the machine, and means for changing the connections of the windings on the said separate poles for the purpose of varying the number of poles of the magnet system to suit the particular armature winding which it is desired should be in operation.

In testimony whereof we have hereunto set our hands in presence of two subscribing witnesses.

BOULTBEE BROOKS.
WILLIAM HOLT.

Witnesses:
HARRY OSMOND PRATT,
ERNEST HARKER.

Copies of this patent may be obtained for five cents each, by addressing the "Commissioner of Patents, Washington, D. C."